United States Patent [19]

Alderman

[11] 4,132,067

[45] Jan. 2, 1979

[54] ACCOUSTIC PROPULSION SYSTEM

[76] Inventor: Robert J. Alderman, 812 59th St., NW., Bradenton, Fla. 33505

[21] Appl. No.: 801,163

[22] Filed: May 27, 1977

[51] Int. Cl.$^2$ .............................................. F02K 11/00

[52] U.S. Cl. ...................................................... 60/204

[58] Field of Search .............. 60/200 R, 204; 181/143

[56] References Cited

U.S. PATENT DOCUMENTS 4,035,582 7/1977 Okamoto ............................. 181/143

*Primary Examiner*—Robert E. Garrett

*Attorney, Agent, or Firm*—Jones, Thomas & Askew

[57] ABSTRACT

The system comprises exerting thrust on an object within a particulate medium, such as air, by creating an oscillatory field, such as sound waves, in the medium and by mounting on the object a control apparatus for controlling the movement of the particulate medium. The control apparatus comprises a barrier including gated openings and utilizes the control apparatus to allow particles of the medium to pass through the barrier when moving in one direction under the influence of the oscillatory field, but prevents the particles from passing back through the barrier when moving in the opposite direction of oscillation under the influence of the field. A net force is thereby imparted to the object.

14 Claims, 7 Drawing Figures

ACCOUSTIC PROPULSION SYSTEM

BACKGROUND OF THE INVENTION

The present invention relates to oscillatory force field such as longitudinal wave phenomena in media capable of carrying such fields, in which the particles forming the media oscillate in two opposite directions along the direction of the field, and more particularly to sound waves which cause the molecules of a medium such as water or air to oscillate to form alternating compressions and rarefactions within the medium. Although energy is transmitted by sound waves in such a medium, the potential of using this energy has not heretofore been utilized to exert a net force on an object within the medium to move the object through the medium.

SUMMARY OF THE INVENTION

Briefly described, the present invention comprises a method and apparatus for propelling an object through a particulate medium. As oscillatory force field such as sound waves is created in a medium such as air, and the particles of the field thereby oscillate in two opposite directions along the direction of said field. A control means such as a rotary slot valve is mounted on said object and when the particles of the medium move in one direction of oscillation, the control means is closed and absorbs the force of said particles, but when said particles move in the second direction of oscillation, the control means is open and permits a substantial number of the particles to move through the control means, thereby generating a net force on the object.

Thus, it is an object of the present invention to utilize the effect of an oscillatory force field on particles of a medium in which the field exists to exert a net force on an object within the medium.

It is a further object of the present invention to provide a method and apparatus for using the energy of particles oscillating in a medium under the influence of sound waves to move an object through the medium.

Other objects, features and advantages of the present invention will become apparent upon reading the following specification when taken in conjunction with the accompanying drawing.

DESCRIPTION OF THE PREFERRED EMBODIMENTS

Figure 1:
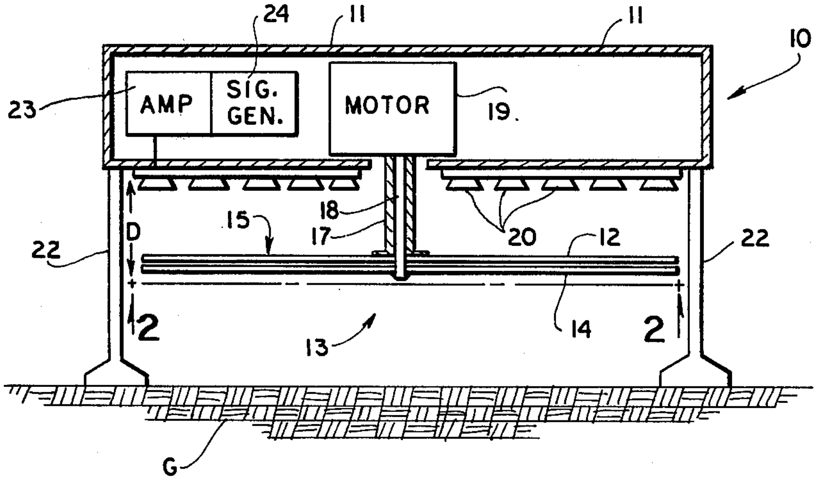
FIG. 1 is a diagrammatic side cross-sectional view of apparatus for practising the method of the present invention.
Figure 2:
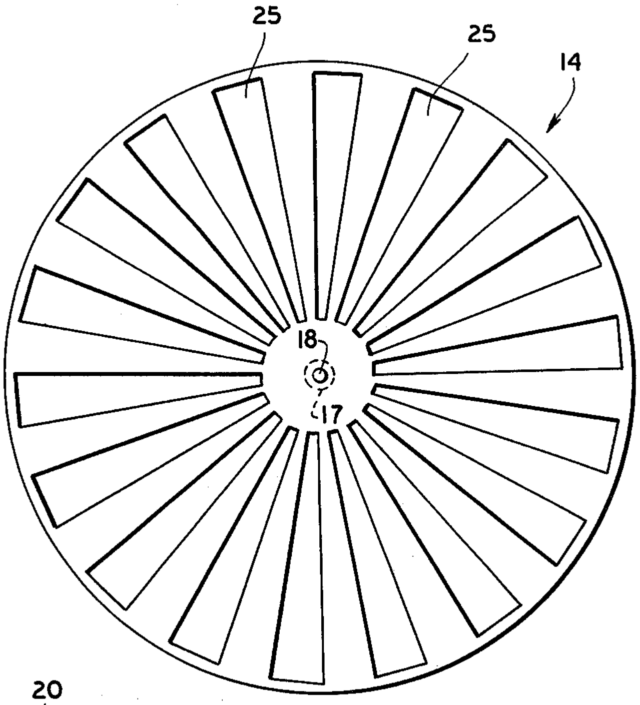
FIG. 2 is a plan view of one of the plates taken along line 2—2 in FIG. 1.

Referring now in more detail to the drawing, in which like numerals indicate like parts throughout the several views, FIG. 1 shows an illustrative embodiment of the invention which includes an accoustic propulsion device 10 comprising a cylindrical frame 11 which is suspended above the ground G on a plurality of legs 22. Mounted on the frame 11 is a control means 13 which includes a motor 19 mounted within the frame 11. Through suitable gear means (not shown), the motor 19 drives in synchronous opposite rotation two concentric shafts 17 and 18 which extend perpendicularly through the bottom of the frame 11. Affixed to the outer shaft 17 is a circular plate 12 which includes radial slots 25 through the plate 12 equally spaced around the plate, as shown in FIG. 2. Inner shaft 18 extends through the hollow center of shaft 17 and through an opening in the center of plate 12 and is fixed to a second plate 14 which is identical to plate 12. Together the slotted plates 12 and 14 form a barrier 15 including gated openings. The motor 19 and shafts 17 and 18 provide a means for rotating the adjacent plates 12 and 14 relative to one another which is thereby a means for opening and closing the gated openings in the barrier.

A series of speakers 20, or other sound generating means, are attached to the underside of the frame 11 and may cover the entire circular area of the underside of the frame 11. Sound waves are generated by the speakers 20 at a frequency which may be selectively determined by a variable signal generator 24 which is mounted within the frame 11 and whose signals are amplified by an amplifier 23, also mounted within the frame 11, and subsequently transmitted to the speakers 20. The apparatus is most efficient when the distance D between the speakers 20 and the barrier 15 is an integral multiple of the wavelength of the sound waves. A free flow of air may pass between the legs 22 into the space between the speakers 20 and the barrier 15.

The motor 19 includes appropriate controls (not shown) for adjusting the speed of rotation of the plates 12 and 14 in their respective directions. An arrangement of plates wherein one plate is stationary and the other plate rotates may also be used to practice the present invention.

Figure 3:
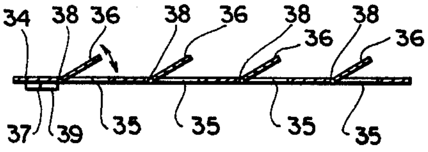
FIG. 3 is a side cross-sectional view of an embodiment of a barrier according to the present invention.

The control means 13 may comprise any form of barrier including gated openings, and is not restricted to a pair of plates having radial slots. For instance, an alternative barrier 15 could include a pair of reciprocating plates each having parallel slots therein, the reciprocation being along a line perpendicular to the slots. As shown in FIG. 3, the barrier according to the present invention may also be a single plate 34 including flap valves 36, swinging about hinges 38, which alternately open and close openings 35 in plate 30. The flap valves 36 may be opened and closed by a motor 39 drivingly connected by a gear linkage (not shown) to each of the hinges 38. The motor may operate either in response to appropriate controls (not shown), such as a signal generator, which may be used to selectively adjust the rate of opening and closing of the flaps 36, or in response to a pressure sensing device 37, such as a microphone, which operates the motor 39 when the pressure adjacent the plate 34 reaches a predetermined value.

It would further be possible to distribute independently operated flap valves over the area of the barrier so that they would respond to the desired pressure increase even when the waves generated toward the barrier were not substantially plane waves parallel to the barrier as would be the case in the apparatus of FIG. 1.

Figure 4:
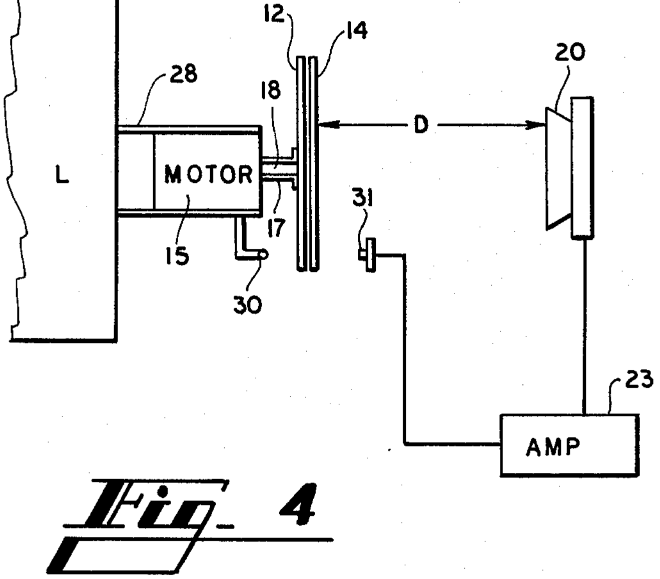
FIG. 4 is a diagrammatic side view of apparatus showing a second embodiment of apparatus for practising the method of the invention.

FIG. 4 shows a second embodiment of the present invention. The rotating plates, 12 and 14 are attached to a load L by support structure 28 which holds the plates at a distance from the load L to provide an air space between the load and the plates. The plates are again driven in synchronous opposite rotation by motor 19 through outer shaft 17 and inner shaft 18. In this embodiment the speaker 20 is not attached to the load L or support structure 28, but is positioned independently and oriented to propagate waves parallel to the surface of the plates 12 and 14. A light source 30 and photocell 31 are also provided. During the rotating of the plates 12 and 14 a beam of light from source 30 will be broken regularly as the slots 25 in the plates 12 and 14 pass by one another. The flashes of light passing through the plates strike the photocell 31 which sends a pulsed signal to the amplifier 23 which in turn drives the speaker 20 at the frequency of the signal received from photocell 31. This results in automatic synchronization of the frequency of the opening and closing of the gated openings with the frequency of the sound waves generated by the speaker 20. In contrast, in the first embodiment, it is necessary to manually set both the signal generator 24 and the speed of the motor 15 to the correct values to obtain synchronization.

It will be understood that the embodiment of the invention shown in FIG. 4 may alternately be arranged vertically to lift a load L using speakers 20 oriented to propagate sound waves in the upward direction toward plates 12 and 14.

Figure 7:
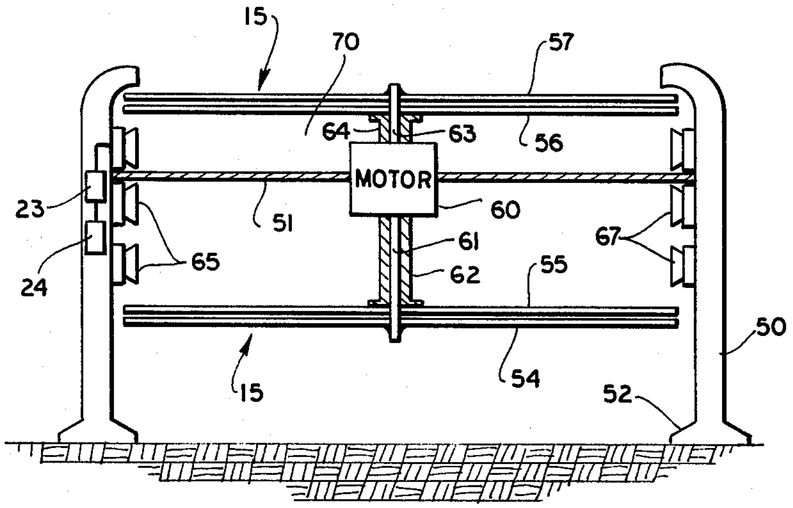
FIG. 7 is a diagrammatic side cross-sectional view of apparatus showing a third embodiment of apparatus for practicing the method of the present invention.

A third embodiment of the present invention is shown in FIG. 7, wherein a device utilizing two of the gated barriers 15 of the present invention is disclosed. From a hollow cylindrical frame 50 terminating in a ground-engaging member 52 a motor 60 is suspended on a plurality of brackets 51. The brackets 51 do not significantly block the movement of air within the device. As in the first embodiment described above, the motor 60 drives concentric shafts 61 and 62, 63 and 64, in synchronous opposite rotation, but each pair of shafts 61 and 62, 63 and 64 in the embodiment of FIG. 7 extends in an opposite direction from the motor 60 to a barrier 15 and may be rotated at a speed independent of the other pair of concentric shafts. Inner shafts 61 and 63 are connected to plates 55 and 56, respectively, and outer shaft 62 and 64 are connected to plates 54 and 57, respectively. Plates 54, 55, 56 and 57 are similar in construction to plate 14 shown in FIG. 2. The pair of barriers and the frame form a chamber 70.

In the embodiment of FIG. 7, two groups of speakers are mounted on the cylindrical inner wall of the frame 50. Speakers 65 cover an area defined by the height of the chamber 70 and a selected distance along the inner wall of the frame 50. Speakers 67 occupy a mirror image location on the opposite side of the chamber 70 from speakers 65. A variable signal generator 24 and amplifier 23 mounted within the hollow frame 50 are connected to both groups of speakers 65 and 67 by appropriate circuitry (not shown) so that the speakers of each group generate sound waves in synchronization at a selected frequency and wavelength directly at the opposite group of speakers. The operation of the embodiment of FIG. 7 depends on resonance phenomena as will be explained below.

OPERATION

When it is desired to produce a net upward force on the accoustic propulsion device 10 shown in FIG. 1, the plates 12 and 14 are set in synchronous opposite rotation about shafts 17 and 18, respectively and the speakers 20 are caused to propagate sound waves toward the plates at a frequency determined by the signal generator 24. Two relative adjustments must be accomplished between the opening and closing of slots through the combined plates 12 and 14 as they counter-rotate and the sound waves propagate from the speakers 20. The first or phase relation adjustment determines the direction of travel of the device. Since the oscillating particles travel alternately in two opposite directions, the opening and closing of the gated openings can be adjusted so that many of the particles are transmitted through the barrier when travelling in one direction, and are blocked and their impact absorbed when the particles are travelling in the opposite direction, which is the desired direction of travel of the device. The selection of which direction of oscillation is transmitted and which is blocked therefore determines the direction of movement of the object within the medium. By the second or frequency synchronization adjustment, the frequency of the longitudinal waves must be substantially synchronized with the rate of opening and closing of the openings through the combined plates 12 and 14 so that the gated openings are consistently substantially open when the particles adjacent the barrier are travelling in the desired transmittal direction, and so that the openings are consistently substantially closed when the particles oscillate in the direction in which their impact is to be absorbed.

Figure 5:
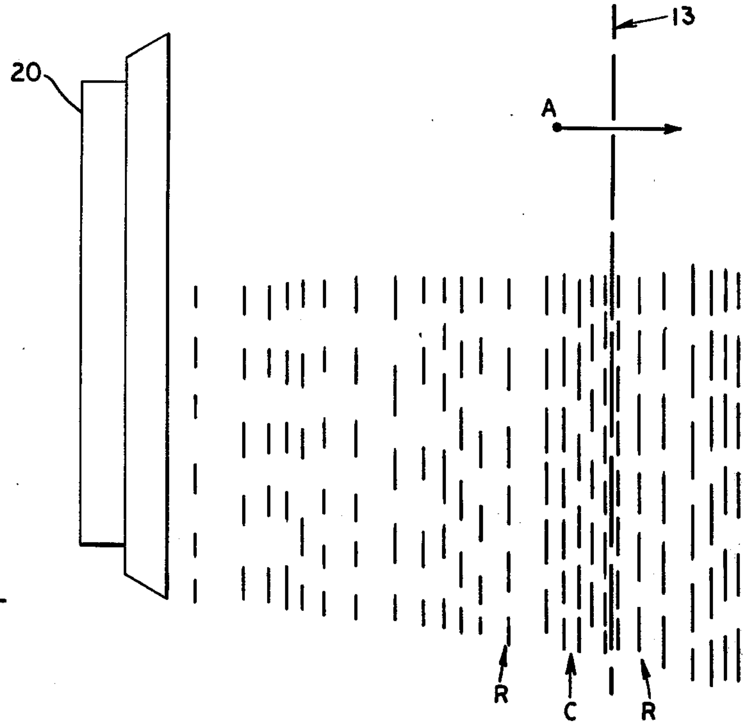
FIG. 5 is a diagrammatic view of particle movement under the influence of sound waves, showing the gated openings of the barrier in an open position.
Figure 6:
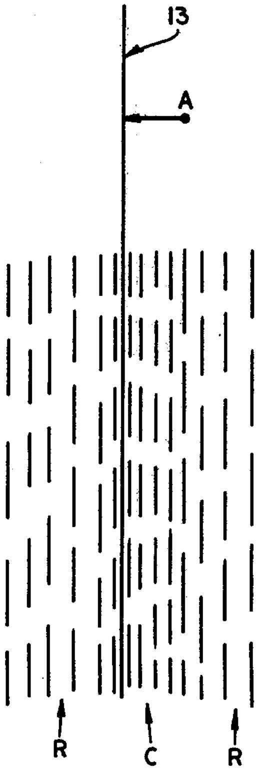
FIG. 6 is a diagrammatic view of particle movement under the influence of sound waves, showing the gated openings in a closed position.

If these adjustments are made to move the acoustic propulsion device upwardly, the particles forming a compression C move through the openings in the barrier toward a rarefaction R on the other side of the barrier, as shown diagrammatically in FIG. 5. However, when the same particles attempt to move back toward the rarefaction R now existing on the original side of the barrier their path is blocked, as shown in FIG. 6. This results in a net force to the left in FIGS. 5 and 6, or upward if the barrier is oriented as in FIG. 1, in which case the force will move the accoutic propulsion device 10 if the net force is sufficient to overcome the force of gravity on the mass of the device.

The first or phase relation adjustment must relate the opening and closing of the gated openings to the compressions and rarefactions of the sound waves as they pass through the barrier. In the first embodiment of the present invention disclosed above, this adjustment need be made only once for sound waves of a fixed wavelength and frequency because the distance between the speakers 20 and the barrier 15, and therefore the phase relationship of the barrier to the waves, is fixed. This is not the case in the second embodiment disclosed above, however, since once the initial first adjustment is made a net force is exerted on the plates and on the load L, causing them to begin to move through the medium away from speaker 20. The plates will soon reach a point where transmittal and impact absorbtion occur for particle oscillations in the wrong directions. Therefore, as the distance D increases the first adjustment must be constantly altered, and it will be understood that a computer could be used to facilitate this continuous alteration.

The first adjustment may be altered continuously when the barrier includes openings which may be opened and closed in response to variations in the pressure of the medium such as the opening 35 in FIG. 3. The pressure sensing device 37 in effect monitors the passage of compressions and rarefactions of the waves, and this information can be used to open to close the flap valves 36 when the compressions and rarefactions of the wave are adjacent to the desired surface of the barrier.

The second or frequency synchronization adjustment must assure that the relationship established when the first or phase adjustment is proper is substantially duplicated for each cycle of a wave that passes the barrier and for each cycle of the opening and closing of the gated openings of the barrier. To accomplish such a result the frequency of the wave cycle must be approximately an integral multiple of or equal to the barrier cycle, with the maximum net force occurring when the two frequencies are equal. In the first embodiment of the present invention the frequencies of wave generation and of opening and closing may be set at the same value and never changed so long as the phase relationship is constant. In the second embodiment the opening and closing frequency constantly changes to maintain the proper phase relationship. In order to simultaneously maintain frequency synchronization, the photocell 31 in the second embodiment "reads" the changing frequency of opening and closing of the gated openings and drives the speakers 20 at the same frequency.

It will be understood that the structure described for continuous adjustment of the phase relationship and frequency synchronization may be utilized on embodiments of the invention other than the second embodiment shown in FIG. 4 including the first embodiment shown in FIG. 1.

It will also be understood that resonance phenomena known to those skilled in the art may occur between the combined plates 12 and 14 and a reflecting surface, such as the ground G in FIG. 1, and that adjustment may be made to obtain a greater net force because of the increased compression of the medium caused by resonance phenomena.

To operate the embodiment of the present invention shown in FIG. 7 the frequency and wavelength of the speakers 65 and 67 are adjusted in a manner known to those skilled in the art to establish resonance within chamber 70. When such a resonant state is established, the resonance chamber 70 will itself act as a source of sound waves travelling outwardly in both directions along the vertical axis of the cylindrical resonance chamber 70. The rotational speed of each pair of plates 54, 55 and 56, 57 is then adjusted in a manner similar to that described above for other embodiments, so that when a region of high pressure is adjacent plate 56 within the chamber 70 the upper barrier is closed and when a region of low pressure is adjacent plate 56 the upper barrier will be open. Similarly, when a region of high pressure is adjacent plate 55 within the chamber the lower barrier will be open, and when a region of low pressure is adjacent plate 55 the lower barrier will be closed. As explained above, this synchronization will result in a net upward force on the device.

The use of sound as a motive force has many advantages over conventional means of propulsion. Accoustic propulsion devices could be operated at low levels of clean electric power. No large linear movements of air such as caused by jet engines or propellers would be necessary. The sound utilized could be outside of the range of human hearing, so that a device could be essentially silent. The method and apparatus of the present invention might satisfy almost any propulsion need, for instance hovercraft, elevators, airplanes, conveyors, or other propulsion systems.

EXAMPLE

An experiment demonstrating the method and apparatus of the present invention was carried out using an apparatus similar to that depicted in FIG. 4, but arranged vertically as described above. A pair of adjacent circular plates having eight slots in each plate was suspended horizontally along with a small electric motor attached to the upper plate, from a counterbalanced, pivoted arm. The upper plate remained stationary, while the motor was rotatably attached through a shaft to the lower plate, and no photocell synchronization device was used. Sound waves of a frequency of about 200 cycles per second (wave length 5.6 feet) were generated upwardly in the direction of the plates. In order to synchronize the rotation of the plate with the wave frequency, and considering the eight openings in each plate, the rotatable plate was rotated at a speed of about 1500 rpm. The experiment was begun with the amplitude (volume) of the sound at a very low level. As the amplitude was increased upward movement of the plates was observed. The procedure followed demonstrated that it was the sound waves that were responsible for the upward movement.

While this invention has been described in detail with particular reference to preferred embodiments thereof, it will be understood that variations and modifications can be effected within the spirit and scope of the invention as described hereinbefore and as defined in the appended claims.

What is claimed is:

1. Apparatus for moving an object through a particulate medium, comprising:

means for creating an oscillatory force field in said medium, the particles of which thereby oscillate in two opposite directions along the direction of said field; and control means mounted on said object for transmitting the force of said particles when said particles are moving in the first of said opposite directions of oscillation, and for absorbing the force of said particles when said particles are moving in the second of said opposite directions of oscillation.

2. The apparatus of claim 1 wherein said medium is a medium capable of carrying longitudinal waves, and wherein said oscillatory force field comprises a series of longitudinal waves passing through said medium.

3. The apparatus of claim 1 wherein said oscillatory force field comprises a series of sound waves.

4. The apparatus of claim 1, wherein said control means comprises:

a barrier mounted on said object, said barrier including gated openings; and means for opening said gated openings to allow particles near said barrier and travelling in a direction of oscillation toward said barrier to pass through said barrier, and for closing said gated openings when said same particles are travelling in the opposite direction of oscillation to prevent said particles from passing back through said barrier.

5. The apparatus of claim 1, wherein said control means comprises;

a barrier including a pair of adjacent plate members rotatably mounted on an axis extending through the centers of said plate members, said plate members including gated openings comprising slots alternating with solid portions extending radially from the center of each of said plate members; and means for opening and closing said gated openings comprising means for rotating at least one of said plate members about said axis relative to the other of said plate members, whereby said gated openings may be selectively opened when particles near said barrier are travelling in a direction of oscillation toward said barrier, so that said particles may be transmitted through said barrier, and selectively closed when said same particles are travelling in the opposite direction of oscillation, whereby said particles impact upon said barrier.

6. The apparatus of claim 1, wherein said control means comprises;

a barrier including a pair of adjacent plate members, rotatably mounted on an axis extending through the centers of said plate members, said plate members including gated openings comprising slots alternating with solid portions extending radially from the center of each of said plate members; and means for opening and closing said gated openings comprising means for rotating at least one of said plate members about said axis relative to the other of said plate members, whereby said gated openings may be selectively opened when particles near said barrier are travelling in a direction of oscillation toward said barrier whereby said particles may be transmitted through said barrier, and selectively closed when said same particles are travelling in the opposite direction of oscillation, whereby said particles impact upon said barrier;

wherein said oscillatory force field comprises a series of longitudinal waves passing through said medium; and wherein said means for opening and closing said gated openings opens and closes said openings in synchronization with the frequency of said longitudinal waves.

7. A method of propelling an object through a medium capable of carrying longitudinal waves, comprising the steps of:

A. affixing to said object a pair of adjacent plates, each of said plates defining openings therein through said plate;

B. propagating longitudinal waves comprising alternating compressions and rarefactions through said medium in the direction of said plates;

C. moving said plates relative to one another in the plane of said plate at a speed synchronized with the frequency of said waves so as to provide a solid barrier to said waves when said compressions of said medium are adjacent one of the surfaces of said adjacent plates, and to provide a perforated barrier to said waves when said rarefactions are adjacent said same surface of said plates.

8. A method of moving an object through a particulate medium comprising the steps of:

creating an oscillatory force field in said medium, the particles of which thereby oscillate in two opposite directions along the direction of said field;

transmitting the force of said particles upon said object when said particles are moving in the first of said opposite directions of oscillation; and absorbing the force of said particles upon said object when said particles are moving in the second of said opposite directions of oscillation.

9. The method of claim 8 wherein said medium is a medium capable of carrying longitudinal waves, and wherein said oscillatory force field comprises a series of longitudinal waves passing through said medium.

10. The method of claim 8 wherein said oscillatory field is a series of sound waves.

11. The method of claim 8 wherein said absorbing step comprises placing a barrier including gated openings in a closed position in the path of said particles when said particles are moving in the second of said opposite directions of oscillation; and wherein said transmitting step comprises alternately opening said gated openings of said barrier in the path of said particles when said particles are travelling in the first of said opposite directions of oscillation to allow said particles to pass through said barrier.

12. The method of claim 8 wherein said absorbing step comprises placing in the path of said oscillating particles a barrier comprising a pair of adjacent plate members rotatably mounted on an axis extending through the centers of said plate members, each plate member including gated openings comprising slots alternating with solid portions extending radially from the center of said plate member, by rotating said plate members relative to one another until the slots of one plate member are adjacent the solid portions of the other plate member; and wherein said transmitting step comprises opening said gated openings by rotating said plate members relative to one another until the slots of one of said plate members are adjacent the slots of the other of said plate members.

13. Apparatus for moving an object through a particulate medium comprising a tubular frame;

a pair of barriers closing off a portion of said frame to form a chamber;

sound wave generating means for creating resonance vibrations within said chamber;

gated openings within each of said barriers; and means for closing said gated openings in a first of said barriers when said resonance vibrations create a region of relatively high pressure within said chamber adjacent said first barrier and alternately opening the gated openings in said first barrier when said resonance vibrations create a region of relatively low pressure adjacent said first barrier, and for simultaneously closing said gated openings in the second of said barriers when said resonance vibrations create a region of relatively low pressure within said chamber adjacent said second barrier and alternately opening said gated openings in said second barrier when said resonance vibrations create a region of relatively high pressure adjacent said second barrier.

14. Apparatus for moving an object through a particulate medium comprising a tubular frame;

a pair of parallel barriers closing off a portion of said frame to form a chamber;

sound wave generating means for creating resonance vibrations within said chamber, said vibrations causing said particles to oscillate parallel to the axis of said tubular frame;

gated openings within each of said barriers; and means for opening said gated openings in a first of said barriers to allow particles near said first barrier oscillating from the interior of said chamber toward the exterior of said chamber to pass through said first barrier and alternately closing said gated openings in said first barrier when said particles are travelling in the opposite direction of oscillation toward the interior of said chamber for causing said particles to impact upon said first barrier, and simultaneously opening said gated openings in said second barrier when said particles are travelling toward the interior of said chamber to allow said particles to pass through said second barrier into said chamber and alternately closing said gated openings in the second of said barriers to cause particles near said second barrier oscillating from the interior of said chamber toward the exterior of said chamber to impact upon said second barrier.

* * * * *